US012212594B1

(12) United States Patent
Wallis et al.

(10) Patent No.: US 12,212,594 B1
(45) Date of Patent: Jan. 28, 2025

(54) ASSESSING VULNERABILITY TO DENIAL-OF-SERVICE ATTACKS

(71) Applicant: Wells Fargo Bank, N.A., San Francisco, CA (US)

(72) Inventors: Shawn Wallis, Fremont, CA (US); David Lorenzi, Phoenix, AZ (US); Matthew Michael Rogers, Charlotte, NC (US); Francisco Perez Salguero, Indian Trail, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 450 days.

(21) Appl. No.: 17/455,641

(22) Filed: Nov. 18, 2021

(51) Int. Cl.
*H04L 9/40* (2022.01)

(52) U.S. Cl.
CPC ...... *H04L 63/1433* (2013.01); *H04L 63/1458* (2013.01); *H04L 63/1483* (2013.01)

(58) Field of Classification Search
USPC .......................................................... 726/25
See application file for complete search history.

(56) References Cited

U.S. PATENT DOCUMENTS

| | | | |
|---|---|---|---|
| 8,516,595 B2 * | 8/2013 | Oro Garcia | H04L 63/126 726/25 |
| 8,997,235 B2 | 3/2015 | De Barros et al. | |
| 9,118,713 B2 | 8/2015 | Bisht et al. | |
| 10,298,611 B1 * | 5/2019 | Caldwell | H04L 63/029 |
| 10,749,896 B2 | 8/2020 | Gadot | |
| 10,951,635 B2 * | 3/2021 | Rayes | H04L 41/0661 |
| 11,023,295 B2 | 6/2021 | Ding et al. | |
| 11,716,343 B2 * | 8/2023 | Rao | H04L 41/22 726/25 |

(Continued)

FOREIGN PATENT DOCUMENTS

| | | |
|---|---|---|
| CN | 103647678 A | 3/2014 |
| CN | 106330954 A | 1/2017 |
| EP | 3343867 A1 * | 7/2018 ......... G06Q 10/0635 |

OTHER PUBLICATIONS

Kalkan et al, ("SDNScore: A Statistical Defense Mechanism Against DDoS Attacks in SDN Environment," IEEE Explore/IEEE Symposium on Computers and Communications (ISCC), pp. 1-7 (Year: 2017).*

(Continued)

*Primary Examiner* — Sakinah White Taylor
(74) *Attorney, Agent, or Firm* — Shumaker & Sieffert, P.A.

(57) ABSTRACT

This disclosure describes techniques that include evaluating websites and web services to identify those that are at risk for a denial-of-service attack or a distributed denial-of-service attack. In one example, this disclosure describes a method that includes interacting, by an assessment computing system, with a target computing system, wherein interacting includes issuing a plurality of requests to the target computing system and receiving a plurality of responses to the plurality of requests; identifying, by the assessment computing system and based on the plurality of responses, a plurality of latency values that are attributable to processing performed by the target computing system; and determining, by the assessment computing system and based on the plurality of latency values, whether the target computing system is vulnerable to a denial-of-service attack.

16 Claims, 4 Drawing Sheets

(56) References Cited

U.S. PATENT DOCUMENTS

| | | | | |
|---|---|---|---|---|
| 2010/0100962 | A1* | 4/2010 | Boren | H04L 63/1441 726/25 |
| 2010/0125649 | A1* | 5/2010 | Day | H04L 43/0888 709/219 |
| 2013/0312101 | A1* | 11/2013 | Lotem | G06F 21/55 726/25 |
| 2014/0380488 | A1* | 12/2014 | Datta Ray | H04L 63/1408 726/25 |
| 2018/0109573 | A1* | 4/2018 | Munger | H04L 45/24 |
| 2018/0255094 | A1* | 9/2018 | Doron | H04L 63/1416 |
| 2019/0158371 | A1* | 5/2019 | Dillon | H04L 47/196 |
| 2020/0201679 | A1* | 6/2020 | Wentz | G06F 9/468 |
| 2021/0392155 | A1* | 12/2021 | Waplington | H04L 63/1433 |

OTHER PUBLICATIONS

Anand et al., "IoVT: Internet of Vulnerable Things? Threat Architecture, Attack Surfaces, and Vulnerabilities in Internet of Things and Its Applications towards Smart Grids", Energies, Sep. 15, 2020, 24 pp.

Livshits et al., "Finding Security Vulnerabilities in Java Applications with Static Analysis", USENIX Security Symposium, vol. 14, Jul. 31-Aug. 5, 2005, pp. 271-286.

* cited by examiner

ASSESSING VULNERABILITY TO DENIAL-OF-SERVICE ATTACKS

TECHNICAL FIELD

This disclosure relates to computer networks, and more specifically, to evaluating threats to computing systems on a network.

BACKGROUND

A denial-of-service (DOS) attack is a type of network-based attack in which a malicious actor seeks to render a network-based computing system or service executing on the computing system unavailable to its intended users. DOS attacks typically involve attempts to overwhelm or flood the targeted computing system with requests until normal network traffic is unable to be processed, thereby effectively denying the service to users. A distributed denial-of-service (DDOS) attack is a type of DOS attack that typically comes from many distributed sources. DDOS attacks can sometimes use multiple compromised computer systems, such as internet-of-things (IoT) devices, as sources of attack traffic.

SUMMARY

This disclosure describes techniques that include evaluating websites and web services to identify those that are at risk for a denial-of-service attack or a distributed denial-of-service attack. In some examples, techniques described herein involve interacting with production and public-facing websites to collect data and identify attributes that suggest that one or more of such websites may be vulnerable to denial-of-service attacks. Data about websites being evaluated may be collected by a group of computing devices that access the websites across a public network, so that the data is collected from a perspective that is similar to that of an anonymous, external malicious actor seeking to disrupt normal functioning of the website. Data may include information, such as response latencies, that may enable inferences about how specific websites are implemented, and the extent to which certain requests may cause the website to perform significant back-end processing. A computing system may analyze the data and generate a score or score report for each website, where the score represents an assessment of the extent to which a given website is vulnerable to a denial-of-service attack. Websites having scores indicating high vulnerability may be selected for further analysis, such as further DoS exercises, lab mockups to validate findings and further analyze website vulnerabilities, or remediation.

Techniques described herein may be performed by an organization that seeks a vulnerability assessment of its own web sites. In addition, such techniques may be used to provide vulnerability assessments as a service to third party web sites.

The techniques described herein may provide certain technical advantages. For instance, by identifying vulnerabilities in public-facing websites, it may be possible to adjust, redesign, otherwise modify such websites to eliminate weaknesses or deficiencies in resiliency, and thereby reduce the possibility of service disruption due to a denial-of service attack. In addition, such website modifications may have the added benefit of improving website responsiveness, reliability, and user experience in steady state or normal conditions, as well as in high-utilization contexts.

In some examples, this disclosure describes operations performed by a computing system, computing cluster, or collection of compute nodes on a network in accordance with one or more aspects of this disclosure. In one specific example, this disclosure describes a method comprising interacting, by an assessment computing system, with a target computing system, wherein interacting includes issuing a plurality of requests to the target computing system and receiving a plurality of responses to the plurality of requests; identifying, by the assessment computing system and based on the plurality of responses, a plurality of latency values that are attributable to processing performed by the target computing system; and determining, by the assessment computing system and based on the plurality of latency values, whether the target computing system is vulnerable to a denial-of-service attack.

In another example, this disclosure describes a system comprising a storage system and processing circuitry having access to the storage system, wherein the processing circuitry is configured to carry out operations described herein. In yet another example, this disclosure describes a computer-readable storage medium comprising instructions that, when executed, configure processing circuitry of a computing system to carry out operations described herein.

The details of one or more examples of the disclosure are set forth in the accompanying drawings and the description below. Other features, objects, and advantages of the disclosure will be apparent from the description and drawings, and from the claims.

DETAILED DESCRIPTION

Entities managing highly-visible websites or collections of such websites typically take measures to protect the websites against denial-of-service attacks. Such measures may include implementing and/or hosting the websites using a distributed cloud infrastructure, ensuring sufficient bandwidth is available on public-facing network connections, and deploying network-based DoS and/or DDOS protections. Such efforts sometimes provide adequate protection. Yet taking additional measures, as described herein, could provide further resiliency against attacks. For instance, an assessment of the way a website (or an application executing on the website) operates or is implemented may be useful in determining how vulnerable the website might be to an attack. An improperly implemented website might still be vulnerable to denial-of-service attacks, even if the website is deployed in a distributed, high-bandwidth, and otherwise secure environment.

An assessment of the way a website operates, as described herein, may also reveal useful information that can be used to improve the website in other ways. For example, if an assessment identifies potential weaknesses or contexts in which the website performs poorly or with high latency, this information can be used to improve the website, resulting in enhanced user experience in high-utilization contexts that do not necessarily involve a malicious attack.

Accordingly, this disclosure describes techniques that assess the vulnerability of a public-facing website by not only taking into account the environment in which the website operates, but also other issues, including specific implementation details associated with the website. In some cases, such an assessment may be performed without any special access to information about how the website operates, and by evaluating information derived from anonymous interactions with the website from third-party infrastructure. In addition, such assessments may be performed on active websites operating in production environments, and may be performed with little or no disruption to such production environments.

Figure 1:
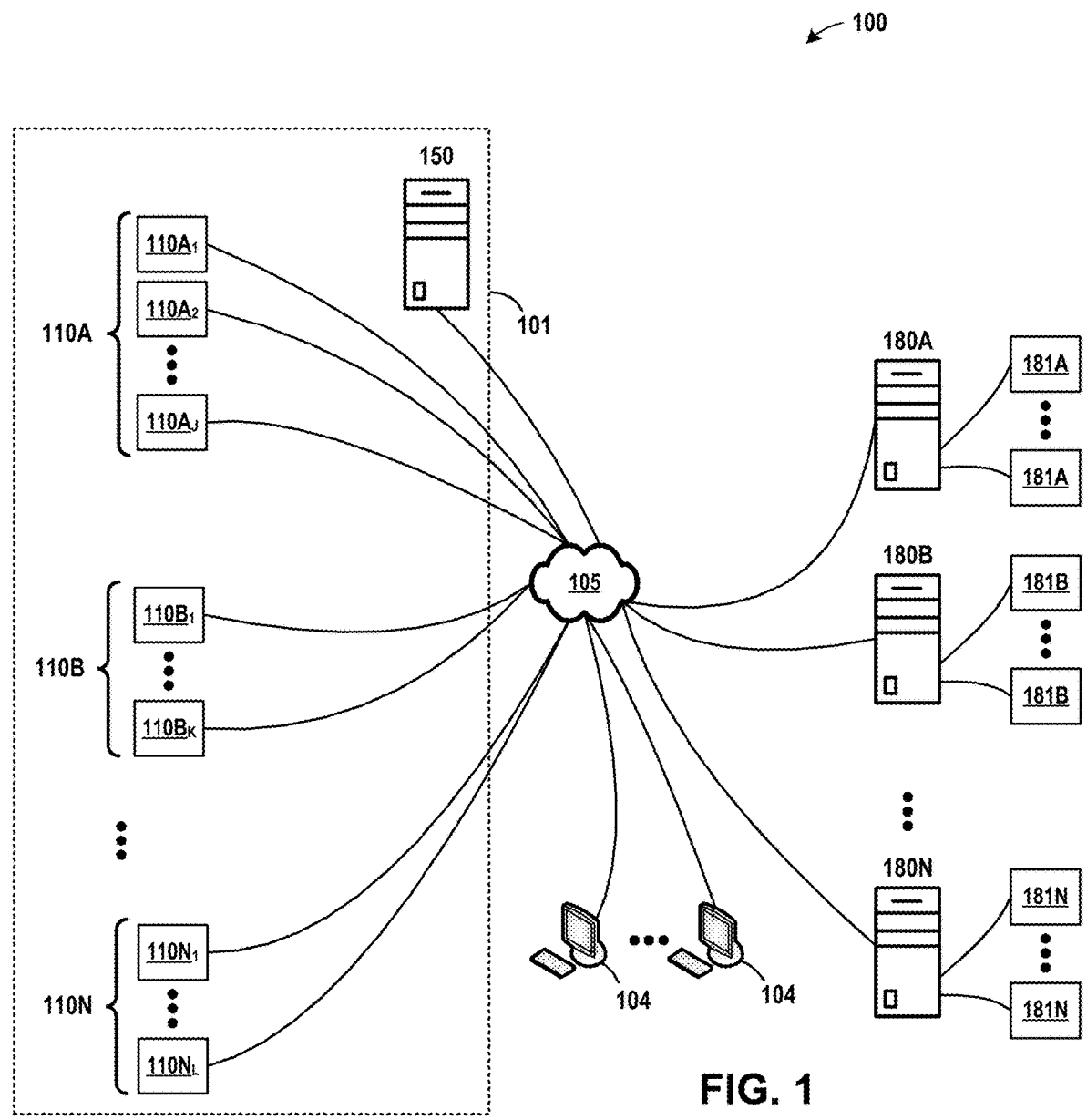
FIG. 1 is a conceptual diagram illustrating an example system in which one or more computing systems, websites, and/or network services are evaluated for vulnerabilities to denial-of-service attacks, in accordance with one or more aspects of the present disclosure.

FIG. 1 is a conceptual diagram illustrating an example system in which one or more computing systems, websites, and/or network services are evaluated for vulnerabilities to denial-of-service attacks, in accordance with one or more aspects of the present disclosure. In FIG. 1, system 100 includes target computing systems 180A, 180B, through 180N (collectively, "target computing systems 180," and representing any number of target computing systems). Each of target computing systems 180 may be a general or specific-purpose computing system that provides services (e.g., a website, application, or other service) to user devices 104 in response to requests received from such user devices 104 over network 105.

Each of target computing systems 180 are primarily described herein as being collectively managed by one entity, which may be a commercial entity or other organization having multiple web sites and offering multiple web services. In other examples, however, each of target computing systems 180 might be operated and/or managed by separate entities. In addition, each of target computing systems 180 is primarily described herein as public-facing computing systems that might be vulnerable to attacks from anonymous, malicious actors accessing one or more of target computing systems 180 through a public network (e.g., network 105). However, in other examples, techniques described herein may also apply to systems deployed within private networks. For instance, one or more techniques may be used to evaluate target systems that are operated primarily or exclusively on an enterprise network or other private or local network.

Accordingly, while network 105 may be primarily described as a public network, such as the internet, in some examples, network 105 may be a private network or an enterprise network. In general, network 105 may include one or more network hubs, network switches, network routers, satellite dishes, or any other network equipment. Such devices or components may be operatively inter-coupled, thereby providing for the exchange of information between computers, devices, or other components (e.g., between one or more client devices or systems and one or more server devices or systems).

Each of target computing systems 180 may include one or more supporting systems 181. For example, target computing system 180A may include one or more supporting systems 181A that may provide back-end processing for services provided by or operations performed by target computing system 180A. Similarly, target computing system 180B may include one or more supporting systems 181B, and in general, target computing system 180N may include one or more supporting systems 181N.

System 100 also includes analysis computing system 150 and a number of additional computing devices 110. Analysis computing system 150 and computing devices 110 may collectively be referred to as assessment computing system 101. Assessment computing system 101 may be implemented in a number of different ways, and in some examples (not shown), assessment computing system 101 may be implemented as a single computing system. But in examples illustrated herein, assessment computing system 101 is a distributed system that includes analysis computing system 150 and computing devices 110, where analysis computing system 150 performs operations relating to analyzing data, and computing devices 110 perform operations relating to collecting data for analysis. In other examples, analysis computing system 150 may perform some or all of the collection operations described herein, and one or more of computing devices 110 may perform some or all of the analysis operations described herein.

Analysis computing system 150 may implemented through any suitable computing system capable of performing operations described herein, and may have any appropriate form (e.g., server computer, workstation, mainframe, appliance, cloud computing system, compute node, and/or other computing system). In some examples, analysis computing system 150 may represent one or more components of a cloud computing system, server farm, and/or server cluster (or portion thereof) that provide services to client devices and other devices or systems. In some examples, analysis computing system 150 may be implemented through one or more virtualized compute instances (e.g., virtual machines, containers) of a data center, cloud computing system, server farm, and/or server cluster. Accordingly, although analysis computing system 150 is illustrated in FIG. 1 as a single system, analysis computing system 150 may be implemented through multiple systems, including through multiple distributed systems based on a cloud-based microservice architecture.

Computing devices 110, also included within assessment computing system 101, include individual computing devices 110A-1 through 110A-J (collectively "computing devices 110A"), computing devices 110B-1 through 110B-K (collectively "computing devices 110B"), and computing devices 110N-1 through 110N-L (collectively "computing devices 110N"). In general, each of these computing devices 110 may be a separate computing system having any appropriate form (e.g., server computers, workstations, mainframes, appliances, cloud computing systems, and/or other computing systems). As illustrated in FIG. 1, all of computing devices 110 are capable of communicating with target computing systems 180 and other systems and devices of FIG. 1 over network 105. In some examples, one or more of computing devices 110 may be implemented through one or more virtualized compute instances (e.g., virtual machines, containers) of a data center, cloud computing system, server farm, and/or server cluster.

Each of computing devices 110 is described herein as performing operations to probe or assess attributes of one or more of target computing systems 180 for vulnerability to a denial-of-service attack. Each of computing devices 110 may have access to target computing systems 180 in a manner that is similar to that of user devices 104, with similar or the same privileges or access rights. However, in at least some examples described herein, computing devices 110 are not operated by users, but instead are configured or programmed to perform operations at the direction of analysis computing system 150 (or another system with assessment computing system 101). Each of computing devices 110 may direct traffic to a specific target computing system 180, possibly in coordination with other computing devices 110 that also direct traffic to that same target computing system 180. In some cases, such traffic may be a simulated attack, or in other cases, such traffic may be used to collect information for evaluating one or of target computing systems 180. Accordingly, each of computing devices 110 may be described as a "probe" computing system, since each may interact with and probe aspects of how one or more of target computing systems 180 operate, and generally for the purpose of learning about potential weaknesses, vulnerabilities, or other aspects of one or more computing devices 110.

In examples described herein, specific sets of computing devices 110 may be organized to evaluate or assess one specific target computing system 180. For example, computing devices 110A (e.g., computing devices 110A-1 through 110A-J) may operate in coordination to interact with and/or evaluate target computing system 180A. Similarly, computing devices 110B may operate in coordination to interact with and/or evaluate target computing system 180B. And in general, computing devices 110N may operate in coordination to interact with and/or evaluate target computing system 180N. Accordingly, in examples described herein, each of computing devices 110 may dedicated to interacting with and/or evaluating a single one of target computing systems 180. However, other implementations are possible, and in such other implementations, various computing devices 110 or sets of computing devices 110 may simultaneously evaluate multiple target computing systems 180.

In the illustration of FIG. 1, and accordance with one or more aspects of the present disclosure, each of computing devices 110A may interact with target computing system 180A. For instance, in an example that can be described with reference to FIG. 1, each of computing devices 110A output signals over network 105, destined for target computing system 180A. Target computing system 180A receives the signals and determines that the signals correspond to requests (e.g., HTTP requests for web pages). Target computing system 180A responds to each request by outputting, over network 105, responsive web pages. Each of computing devices 110 receives its requested web pages. Computing devices 110 may coordinate with each other and continue to request web pages and receive responses from target computing system 180A. Each of computing devices 110 collect data about the responses it receives from target computing system 180A. For example, each of computing devices 110 may identify and store the number, type, and size of various elements within the web pages received from target computing system 180A. Each of computing devices 110 may also observe latencies associated with certain web pages. In some examples, each of computing devices 110 may determine latencies that are attributable to processing performed at target computing system 180A, rather than to network congestion or other causes. Each of computing devices 110 may also, based on its interactions, identify or infer information about infrastructure used to implement target computing system 180A and supporting systems 181A. Each of computing devices 110 store information about target computing system 180A, including information about elements within requested web pages, latencies, and infrastructure.

Other computing devices 110 may interact with other target computing systems 180. For instance, continuing with the example being described with reference to FIG. 1, each of computing devices 110B coordinate to request web pages and other resources from target computing system 180B. Each of computing devices 110B collect and store information about elements within web pages served by target computing system 180B, latencies associated with such web pages, and infrastructure used to implement target computing system 180B and supporting systems 181B. Similarly, and in general, each of computing devices 110N coordinate to request web pages and other resources from target computing system 180N. Each of computing devices 110N collect and store information about computing device 110N.

Each of computing devices 110 may report information to analysis computing system 150. For instance, again referring to FIG. 1, each of computing devices 110 output signals over network 105. Analysis computing system 150 receives the signals and determines that the information corresponds to information about the data collected from each of target computing systems 180.

Analysis computing system 150 may calculate a vulnerability score for each of target computing systems 180. For instance, referring once more to FIG. 1, analysis computing system 150 evaluates the information received from computing devices 110 and calculates a score for each of target computing systems 180. In some examples, the score provides an assessment of the extent to which each of target computing systems 180 is vulnerable to a denial-of-service attack or a distributed denial-of-service attack. Analysis computing system 150 may use the score to identify one or more of target computing systems 180 for further evaluation and/or remediation.

Figure 2:
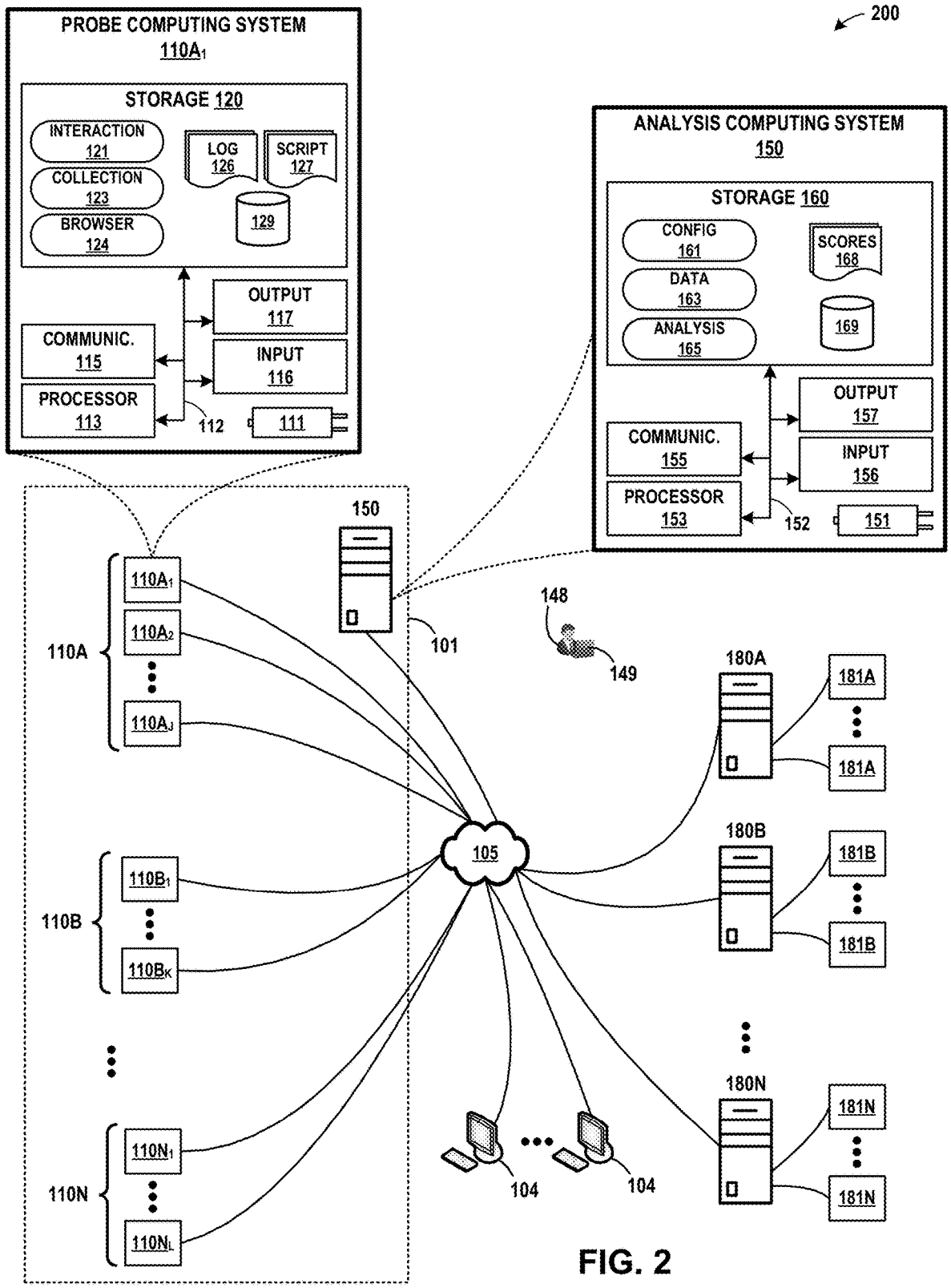
FIG. 2 is a block diagram illustrating an example system in which computing systems, websites, and/or network services are evaluated for vulnerabilities to denial-of-service attacks, in accordance with one or more aspects of the present disclosure.

FIG. 2 is a block diagram illustrating an example system in which computing systems, websites, and/or network services are evaluated for vulnerabilities to denial-of-service attacks, in accordance with one or more aspects of the present disclosure. FIG. 2 illustrates system 200, which may be similar to system 100 of FIG. 1, and may be considered an example or alternative implementation of aspects of system 100 of FIG. 1. In the example of FIG. 2, system 200 includes many of the same elements described in FIG. 1, and elements illustrated in FIG. 2 may correspond to earlier-illustrated elements that are identified by like-numbered reference numerals. In general, such like-numbered elements may represent previously-described elements in a manner consistent with prior descriptions in connection with FIG. 1. For example, network 105 of FIG. 2 may correspond to network 105 of FIG. 1. Similarly, computing device 110A1 of FIG. 2 may correspond to computing device 110A1 of FIG. 1, and analysis computing system 150 of FIG. 2 may correspond to analysis computing system 150 of FIG. 1.

System 200 also includes administrator device 149, which may be operated by administrator 148. Analysis computing system 150 may receive input from administrator device 149 (e.g., derived from activity of administrator 148), and such input may correspond to configuration information, programming code, data for use by analysis computing system 150, or other information. In some examples, administrator device 149 may be a part of assessment computing system 101 or analysis computing system 150. In other examples, administrator device 149 may be a separate system that is directly connected to analysis computing system 150. In still other examples, administrator device 149 may be a separate system that communicates with analysis computing system 150 over network 105 or another network.

In FIG. 2, analysis computing system 150 is illustrated as including underlying physical compute hardware that includes power source 151, one or more processors 153, one or more communication units 155, one or more input devices 156, one or more output devices 157, and one or more storage devices 160. Storage devices 160 may include configuration module 161, data module 163, analysis module 165, score reports 168, and data store 169. One or more of the devices, modules, storage areas, or other components of analysis computing system 150 may be interconnected to enable inter-component communications (physically, communicatively, and/or operatively). In some examples, such connectivity may be provided by through communication channels, which may include a system bus (e.g., bus 152), a network connection, an inter-process communication data structure, or any other method for communicating data.

Power source 151 of analysis computing system 150 may provide power to one or more components of analysis computing system 150. One or more processors 153 of analysis computing system 150 may implement functionality and/or execute instructions associated with analysis computing system 150 or associated with one or more modules illustrated herein and/or described below. One or more processors 153 may be, may be part of, and/or may include processing circuitry that performs operations in accordance with one or more aspects of the present disclosure. One or more communication units 155 of analysis computing system 150 may communicate with devices external to analysis computing system 150 by transmitting and/or receiving data, and may operate, in some respects, as both an input device and an output device. In some or all cases, communication unit 155 may communicate with other devices or computing systems over network 105 or over other networks.

One or more input devices 156 may represent any input devices of analysis computing system 150 not otherwise separately described herein, and one or more output devices 157 may represent any output devices of analysis computing systems 150 not otherwise separately described herein. Input devices 156 and/or output devices 157 may generate, receive, and/or process output from any type of device capable of outputting information to a human or machine. For example, one or more input devices 156 may generate, receive, and/or process input in the form of electrical, physical, audio, image, and/or visual input (e.g., peripheral device, keyboard, microphone, camera). Correspondingly, one or more output devices 157 may generate, receive, and/or process output in the form of electrical and/or physical output (e.g., peripheral device, actuator).

One or more storage devices 160 within analysis computing system 150 may store information for processing during operation of analysis computing system 150. Storage devices 160 may store program instructions and/or data associated with one or more of the modules described in accordance with one or more aspects of this disclosure. One or more processors 153 and one or more storage devices 160 may provide an operating environment or platform for such modules, which may be implemented as software, but may in some examples include any combination of hardware, firmware, and software. One or more processors 153 may execute instructions and one or more storage devices 160 may store instructions and/or data of one or more modules. The combination of processors 153 and storage devices 160 may retrieve, store, and/or execute the instructions and/or data of one or more applications, modules, or software. Processors 153 and/or storage devices 160 may also be operably coupled to one or more other software and/or hardware components, including, but not limited to, one or more of the components of analysis computing system 150 and/or one or more devices or systems illustrated or described as being connected to analysis computing system 150.

Configuration module 161 of analysis computing system 150 may perform functions relating to configuring one or more of computing devices 110 to interact with target computing systems 180 over network 105. Configuration module 161 may generate commands, instructions, scripts, or programming information for use in configuring one or more of computing devices 110. In some examples, such commands, instructions, scripts, or programming information may be derived from input from a user (e.g., administrator 148 through administrator device 149). In other examples, such commands, instructions, scripts, or programming information may be derived from information stored in either a local library (e.g., data store 169) or remote library. Configuration module 161 may cause analysis computing system 150 to communicate with one or more of computing devices 110 (e.g., over network 105) in order to prepare or configure such computing devices 110 to communicate with target computing systems 180.

Data module 163 of analysis computing system 150 may perform functions relating to collecting, collating, and/or organizing data received from one or more computing devices 110. In some examples, the data received from various computing devices 110 may pertain to assessments of specific target computing systems 180. Data module 163 may therefore organize or tag such information to enable analyses of data associated with specific target computing systems 180. In particular, data module 163 may make data for specific target computing systems 180 available to analysis module 165 of analysis computing system 150, thereby enabling analysis module 165 to perform vulnerability assessments of each of target computing systems 180 based on data relevant to each such target computing system 180. Data module 163 may store and maintain data it receives and/or generates in data store 169.

Analysis module 165 of analysis computing system 150 may perform functions relating to assessing the vulnerability of one or more target computing systems 180 to a denial-of-service attack. Analysis module 165 may access data within data store 169 and use the data to generate a score (e.g., score report 168) that represents a quantitative and/or qualitative metric that may enable administrators, managers, and/or executives responsible for one or more of the services provided by target computing systems 180 to be informed about how secure each such target computing system 180 may be, and to make informed decisions about how to further secure each such target computing system 180. In some examples, such a score may help identify which web pages and/or services provided by target computing systems 180 are at highest risk of being affected by a denial-of-service attack. Analysis module 165 may calculate the score based on a combination of potential high latency target web pages or services, high element pages/connections, and/or extreme latency interval discrepancies. Scores and other evaluations generated by analysis module 165 may be used to help identify target computing systems 180 for inclusion into denial-of-service exercises, score validation exercises, lab mockups, and/or remediation.

Data store 169 of analysis computing system 150 may represent any suitable data structure or storage medium for storing information related to data collected by computing devices 110, score reports 168, or other data underlying or representing assessments of one or more target computing systems 180 for vulnerability to denial-of-service attacks. The information stored in data store 169 may be searchable and/or categorized such that one or more modules within analysis computing system 150 may provide an input requesting information from data store 169, and in response to the input, receive information stored within data store 169. Data store 169 may be primarily maintained by data module 163.

For ease of illustration, aspects of each of computing devices 110 may be described herein with reference to computing device 110A1 illustrated in FIG. 2. Each of the other computing devices 110 may be implemented in a similar manner. Descriptions herein with respect to computing device 110A1 may correspondingly apply to one or more other computing devices 110. Such other computing devices 110 (e.g., computing device 110A2, computing device 110B1, any of computing devices 110N) may therefore be considered to be described in a manner similar to that of computing device 110A1, and may also include the same, similar, or corresponding components, devices, modules, functionality, and/or other features. However, as also suggested above, one or more of computing devices 110 may be implemented in a manner differently than the illustrated computing device 110A1, and this disclosure is intended to encompass such implementations.

In the example of FIG. 2, computing device 110A1 is illustrated as including underlying physical hardware, which may include power source 111, one or more processors 113, one or more communication units 115, one or more input devices 116, one or more output devices 117, and one or more storage devices 120. Storage devices 120 may include interaction module 121, collection module 123, and browser module 124. These components may be implemented or may correspond to similar components described elsewhere herein. For example, power source 111 may provide power to one or more components of computing device 110A1. One or more processors 113 may implement functionality and/or execute instructions associated with computing device 110A1 or associated with one or more modules of computing device 110A1. One or more communication units 115 of computing device 110A1 may communicate with devices external to computing device 110A1 by transmitting and/or receiving data over a network or otherwise. One or more input devices 116 and output devices 117 may generate, receive, and/or process input and output, respectively. One or more storage devices 120 may store program instructions and/or data associated with one or more of the modules of storage devices 120 in accordance with one or more aspects of this disclosure.

Interaction module 121 of probe computing system 110A1 may perform functions relating to interacting with one or more of target computing systems 180 in order to evaluate and/or assess the vulnerability of one or more of target computing systems 180 to a denial-of-service attack. Interaction module 121 may cause computing device 110A1 to send requests to one or more of target computing systems 180, receive responsive web pages, and respond to input prompts included within web pages or other content received from target computing systems 180. Interaction module 121 may cause computing device 110A1 coordinate with other computing devices 110 to interact with a specific target computing system 180 in a way that enables an assessment of how such target computing system 180 handles multiple requests.

Collection module 123 of probe computing system 110A1 may perform functions relating to collection of information about target computing systems 180 that can be used to assess vulnerabilities of such target computing systems 180. Collection module 123 may identify the type and size of elements included within web pages retrieved from target computing systems 180. Collection module 123 may calculate various latencies associated with interactions with target computing systems 180, including latencies associated with retrieving web pages or other network resources. Collection module 123 may determine to what extent, if any, such latencies exceed a baseline or expected latency values. Collection module 123 calculate how such latencies differ over time, or differ based on certain conditions or types of interactions associated with the retrieval of the web page or network resource. Collection module 123 may also determine what portion of such latencies are attributable to or caused by processing performed by one or more target computing systems 180 and supporting systems 181, rather than attributable to other causes, such as network congestion or bandwidth limitations. Collection module 123 may log information about interactions with target computing systems 180 within one or more log files 126.

Browser module 124 of probe computing system 110A1 may perform functions relating to emulating, simulating, and/or automating web browser functions for computing device 110A1. In some examples, browser module 124 may be used to interact with one or more of target computing systems 180 and may be used to automate actions of an actual web browser, thereby more closely emulating an actual user interacting with a given target computing system 180. Browser module 124 may maintain a browser context, thereby enabling various elements of web pages served by target computing systems 180 (e.g., images and JavaScript code) to be processed or stored within the browser context.

Data store 129 of probe computing system 110A1 may represent any suitable data structure or storage medium for storing information related to data associated with interactions by computing device 110A1 with any of target computing systems 180. The information stored in data store 129 may be searchable and/or categorized such that one or more modules within computing device 110A1 may provide an input requesting information from data store 129, and in response to the input, receive information stored within data store 129. Data store 129 may be primarily maintained by collection module 123.

In FIG. 2, and accordance with one or more aspects of the present disclosure, analysis computing system 150 may output to computing devices 110 information about how to interact with target computing systems 180. For instance, in an example that can be described in the context of FIG. 2, administrator 148 may seek to initiate or conduct an evaluation of DoS vulnerabilities associated with one or more target computing systems 180. In such an example, administrator device 149 detects input (e.g., from administrator 148) and outputs a signal to analysis computing system 150. Input device 156 of analysis computing system 150 detects input and outputs information about the input to configuration module 161. Configuration module 161 determines that the input corresponds to configuration information that can be used to configure one or more computing devices 110 to collect information about target computing systems 180. Configuration module 161 causes communication unit 155 to output a series of signals over network 105.

Each of computing devices 110 may use information from analysis computing system 150 to configure data collection operations. For instance, continuing with the example being described with reference to FIG. 2, each of computing devices 110 receive a signal and determine that the signal includes configuration information from analysis computing system 150. For computing device 110A1, for example, communication unit 115 of computing device 110A1 detects a signal over network 105 and outputs information about the signal to interaction module 121. Interaction module 121 determines that the signal includes information describing information to be collected from one or more of target computing systems 180. The information may include instructions, programming information, scripts, or other configuration data (hereinafter "scripts 127") that enable computing device 110A1 to interact with or provide instructions about how to interact with one or more of target computing systems 180 to conduct an evaluation of DoS vulnerabilities associated with target computing systems 180. Interaction module 121 may cause scripts 127 to be stored within data store 129 so that scripts 127 are available for use when computing device 110A conducts the evaluation of target computing systems 180. Similar configurations pertaining to data collection operations take place at each of the other devices within computing devices 110A, at each of computing devices 110B, and in general, at each of computing devices 110N.

One or more of computing devices 110 may interact with one or more of target computing systems 180. For instance, again referring to FIG. 2 and with reference specifically to computing device 110A1 and target computing system 180A, communication unit 115 of computing device 110A1 detects a signal over network 105 and outputs to interaction module 121 information about the signal. Interaction module 121 determines that the signal corresponds to a command (e.g., from analysis computing system 150) to initiate collection of data about target computing system 180A, using information derived from scripts 127 stored within data store 129. In response to the signal, interaction module 121 causes communication unit 115 to output a series of signals over network 105 destined for target computing system 180A. In some examples, the signals correspond to a systematic series of requests, by computing device 110A1, for web pages and other content published by target computing system 180A. Communication unit 115 of computing device 110A1 receives, over network 105 and in response to the series of requests for web pages, a responsive series of signals. Communication unit 115 outputs information about the responsive series of signals to interaction module 121. Interaction module 121 determines that the signals correspond to web pages and other content responsive to the requests.

Computing device 110A1 may attempt to crawl other pages of target computing system 180A. For instance, continuing with the example being described with reference to computing device 110A1 and target computing system 180A of FIG. 2, interaction module 121 evaluates the web pages received from target computing system 180A, and identifies links, input-based forms included within web pages and other content, and other components of the web pages. Interaction module 121 uses the identified information to identify additional web pages to request from target computing system 180A. In response to such an evaluation and using other information, interaction module 121 causes communication unit 115 to output a new series of signals over network 105 intended for target computing system 180A. Computing device 110A1 then receives a new set of responsive signals, evaluates the new set of responsive signals, and the process repeats. Computing device 110A1 may thus operate as a web spider to crawl pages published by target computing system 180A, using various techniques to retrieve a significant number of web pages published at target computing system 180A. In general, computing device 110A1 may continue performing this web spider crawl of web pages published by target computing system 180A until computing device 110A1 has requested some, all, or a sufficient number of web pages and other content items from target computing system 180A. In some examples, computing device 110A may continue crawling pages published by target computing system 180A indefinitely.

Computing device 110A1 may identify certain information about interactions with target computing system 180A. For instance, continuing with the example being described in connection with FIG. 2, interaction module 121 of computing device 110A1 outputs to collection module 123 information about its interactions with target computing system 180A. Collection module 123 determines that the information includes information about interactions with target computing system 180A. Collection module 123 identifies, based on the information, the type and size of each of the elements (e.g., large video or image content, binary content, text content, or scripting code) included within web pages retrieved from target computing system 180A. Collection module 123 also calculates various latencies associated with interactions with target computing system 180A, including latencies associated with retrieving web pages or other network resources from target computing system 180A. Collection module 123 may calculate or otherwise determine a baseline or expected latency for interactions with target computing system 180A. Collection module 123 determines to what extent, if any, latencies experienced during interactions with target computing system 180A exceed the baseline or expected latency. Collection module 123 may also calculate how such latencies differ over time, or differ based on utilization levels, traffic levels, other conditions, or the nature of the interactions. Collection module 123 logs information about interactions with target computing system 180A as one or more log files 126. Collection module 123 may store such log files 126 in data store 129.

In some examples, in an effort to identify vulnerabilities associated with target computing system 180A, collection module 123 of computing device 110A1 may evaluate the number, type, and size of elements included in web pages served by target computing system 180A. Where the number and/or size of such elements is large or require special processing, target computing system 180A might require more computational effort than normal to serve web pages including such elements. In some cases, however, for web pages that have a large number of elements and/or have elements of a large size, more bandwidth may be consumed by serving the web page, but a significantly higher computational effort might not be needed. In such an example, target computing system 180A might be able to output a response to a request in a timely manner, but due to network congestion, the response might not arrive at the requesting computing device 110 in a timely manner.

While considerations pertaining to available bandwidth are relevant to whether target computing system 180A is vulnerable to a denial-of-service attack, other considerations may also be relevant to an assessment of whether target computing system 180A is vulnerable to such an attack. In particular, a vulnerability assessment may also include identifying the extent to which target computing system 180A (and/or supporting systems 181A) can be induced to perform significant computational effort, such as through interactions with target computing system 180A or by requesting certain web pages available at target computing system 180A. In other words, if target computing system 180A and supporting systems 181A can be induced to attempt to perform processing that is at or above available processing capability, target computing system 180A might be unable to respond to requests in a timely manner, even if bandwidth is readily available to target computing system 180A. Target computing system 180A may therefore also be vulnerable to a denial-of-service attack if target computing system 180A can be induced to attempt to perform processing that nears or exceeds its processing capability.

Accordingly, collection module 123 of computing device 110A1 may also seek to identify ways to initiate significant processing by target computing system 180A (and supporting systems 181A). For example, pursuant to such an effort, interaction module 121 may cause computing device 110A1 to interact with target computing system 180A in a way that tends to identify requests, commands, or operations that cause target computing system 180A to initiate computational effort by target computing system 180A or by supporting systems 181A. Where computing device 110A1 (and computing devices 110 generally) operate externally to target computing systems 180, and are not given any special access to target computing systems 180 or privileges not afforded to other users on public network 105, details about the architecture of target computing system 180A or how target computing system 180A operates might not be readily apparent, and therefore, operations that may cause target computing system 180A to initiate computational effort might not be immediately apparent. However, such computational effort might be identified by observing attributes of certain interactions with target computing system 180A. Accordingly, interaction module 121 may cause computing device 110A1 to interact with target computing system 180A in a variety of different ways in seeking to identify certain requests, commands, or operations that seem to cause target computing system 180A (or supporting systems 181A) to perform processing or otherwise have an impact on network-based connections. In particular, latencies that are attributable to computational effort being expended by target computing system 180A, and/or changes in latency over time (e.g., where latency has increased from a baseline level or is higher than expected given current conditions) may provide information about how target computing system 180A operates. In some cases, latency and other attributes may provide information about under what circumstances target computing system 180A performs significant processing or perform otherwise performs operations that could leave target computing system 180A vulnerable to a "low and slow" denial-of-service attack. Accordingly, interaction module 121 may cause computing device 110A1 to interact with target computing system 180A in diverse and varying conditions to identify certain, commands, or operations that seem to cause target computing system 180A (or supporting systems 181A) to perform processing or otherwise have an impact on network-based connections. By evaluating changes in latency in the responses of target computing system 180A to various interactions, interaction module 121 may identify types of interactions that initiate processing at target computing system 180A and/or supporting systems 181A.

For instance, in one specific example, target computing system 180A may serve as a search engine. In such an example, target computing system 180A may process search requests by causing supporting systems 181 to perform processing. Such processing may include executing a database query, retrieving records from the database corresponding to the search results, formatting the results for display, generating a web page that includes the search results, and outputting the web page in response to the search query. Accordingly, by submitting a search query to target computing system 180A, computing device 110A1 is able to induce target computing system 180A (and/or supporting systems 181A) to perform computations and consume processing resources. Some search queries may require more processing than others, however, and identifying high latencies associated with some search queries might help identify which search queries tend to require target computing system 180A to initiate operations that consume substantial processing resources. To implement a search engine, target computing system 180A may initiate a query of a database (e.g., hosted by supporting systems 181) for each search request received. In other examples, a database query may be initiated only in certain circumstances, so collection module 123 may assess whether queries are performed in certain contexts, or whether other types of resource intensive operations processing are performed in certain contexts (e.g., in response to various types of search queries). In some cases, for example, target computing system 180A may process a search query using primarily static database queries that tend to require less resources. In other cases, target computing system 180A may process a search query using primarily dynamic database queries. Such dynamic queries, which may be based on user input, may require more resources to process, and thus may cause more processing resources to be consumed by target computing system 180A and supporting systems 181A. Accordingly, where target computing system 180A implements a search engine, collection module 123 of computing device 110A1 may assess information about latencies for certain types of queries issued to target computing system 180A in certain contexts. Collection module 123 stores information about its assessments in data store 129.

In another example, computing device 110A1 may observe how target computing system 180A responds to requests to cancel operations and/or close connections. For instance, and still with reference to FIG. 2, interaction module 121 may cause computing device 110A1 to output a request over network 105, destined for target computing system 180A. Target computing system 180A may receive the initial request over network 105 and initiate processing to service the request. Interaction module 121 may, soon after outputting its request, cause computing device 110A1 to output a cancellation signal over network 105 destined for target computing system 180A. Eventually, target computing system 180A receives a signal corresponding to the cancellation by computing device 110A1. In some examples, target computing system 180A may be implemented in a way causes target computing system 180A (or supporting systems 181A) to continue performing processing to service the request, even after cancelation by computing device 110A1. In such an example, the initial request followed by a cancellation effectively causes target computing system 180A to perform unproductive work. In some cases, this scenario might correspond to one end of a connection being closed by computing device 110A1 while the other end is left open by target computing system 180A (e.g., a "half-open" connection).

Computing device 110A1 may evaluate how target computing system 180A responds to requests to cancel operations and/or close connections. Interaction module 121 may evaluate responses to its requests and subsequent cancelation requests. Interaction module 121 may determine, based on the evaluation, that by causing initiating many such requests and cancelations, it can cause target computing system 180A to initiate many one ended processes (i.e., "half-open" connections) at target computing system 180A. Interaction module 121 might avoid issuing enough requests to degrade operations of target computing system 180A, particularly if target computing system 180A is a productive system that is performing operations to serve legitimate users of target computing system 180A (e.g., users operating user devices 104). However, interaction module 121 may perform enough requests to enable an evaluation of how target computing system 180A operates under the described circumstances, and may determine whether it is possible to induce target computing system 180A to perform significant work to service such requests. If so, it may be possible for a malicious actor to exhaust resources at target computing system 180A (or supporting systems 181A) and thereby degrade the services of target computing system 180A. Such a degradation may result in a decline in the quality of the user experience (e.g., high latency web pages, lack of responsiveness, or other effects). In extreme cases, such a degradation may result in a failure of target computing system 180A to service any requests, such that a legitimate user is denied of access to services provided by target computing system 180A. Interaction module 121 of computing device 110A may evaluate information about interactions with target computing system 180A relating to such "half-open" connections (or similar conditions) and store information about its assessments in data store 129.

Computing device 110A1 may identify resource limitations implemented at target computing system 180A that may make target computing system 180A vulnerable to a denial-of-service attack. For instance, interaction module 121 of computing device 110A1 may be able to identify, based on interactions by computing device 110A1 with target computing system 180A, that a certain amount of resources are allocated to a specific application. For example, interaction module 121 may determine that a specific application executing on target computing system 180A might be designed to accommodate up to 1000 clients, or maintain up to 1000 connections. Or in another case, interaction module 121 may be able to determine, based on timeout testing, that the application is designed to timeout connections at 30 seconds. Interaction module 121 may coordinate with other computing devices 110 in attempt to cause the application executing on target computing system 180A to interact with a number of clients that nears (or exceeds) 1000. Alternatively (or in addition), interaction module 121 may seek (e.g., through collaboration with other computing devices 110) to cause target computing system 180A to open a number of connections for the application that nears (or exceeds) 1000. If the application implemented at target computing system 180A has a 30 second timeout associated with connections, opening more than 1000 connections within 30 seconds is likely to exhaust at least some of the resources target computing system 180A has allocated to the application. If interaction module 121 of computing device 110A1 (or a collaboration of computing devices 110) is able to exhaust a significant amount of the resources target computing system 180A allocates to the application, the service that the application executing at target computing system 180A may be vulnerable to a denial-of-service attack, or at least may be vulnerable to a degradation in the user experience.

In yet another example, computing device 110A1 may evaluate the extent to which interactions with target computing system 180A exhibit signs of other vulnerabilities that could be exploited. For instance, in some cases, computing device 110A1 may interact with target computing system 180A, and interaction module 121 may determine that the interactions show signs of input data being reflected by target computing system 180A. For example, if target computing system 180A receives data in an HTTP request from computing device 110A1 and includes that data within the immediate response to the request in an unsafe way, target computing system 180A may be vulnerable to reflected cross-site scripting. While cross-site scripting and other vulnerabilities might not always be directly relevant to a denial-of-service attack, such vulnerabilities may play a part in a denial-of-service attack. Therefore, interaction module 121 may assess target computing system 180A for these and other vulnerabilities, and store information about such assessments in data store 129.

Examples herein have been primarily described with reference to computing device 110A1 interacting with target computing system 180A. However, each of the other computing devices 110 illustrated in FIG. 2 may, in other examples, perform corresponding or similar operations and/or may coordinate with computing device 110A1 and other computing devices 110 to interact with one or more of target computing systems 180 and collect relevant information. In some examples, sets of computing devices 110 may coordinate to organize interactions with specific target computing systems 180, and derive detailed information about each specific target computing system 180, which may include information about latencies that arise in responses across each set of computing devices 110. For example, if a sufficient number of computing devices 110 in a given set of computing devices 110 can synchronize or coordinate interactions with a specific target computing system 180, it may be possible to identify problematic or extreme latencies that occur in various contexts. Such contexts may arise during periods in which traffic levels vary and/or during periods in which processing utilization by the target computing system 180 (and supporting systems 181) are at differing levels.

In the example illustrated in FIG. 2, for example, a set of computing devices 110 (e.g., computing devices 110A) may synchronize and/or coordinate interactions to identify various attributes and/or latencies that occur with responses from target computing system 180A in various contexts. Similarly, a different set (e.g., computing devices 110B) may synchronize and/or coordinate interactions to identify various attributes and/or latencies that occur with responses from target computing system 180B in various contexts. And in general, computing devices 110N may synchronize and/or coordinate interactions to identify various attributes and/or latencies that occur with responses from target computing system 180N. Accordingly, in examples described in connection in FIG. 2, different sets of computing devices 110 may each interact with a different one of target computing systems 180. In other examples, however, one set of computing devices 110 may interact with more than one target computing system 180 being evaluated, or in some examples, one set of computing devices 110 may interact with all target computing systems 180 being evaluated.

Computing device 110A1 may communicate the collected information to analysis computing system 150. For instance, still referring to FIG. 2, and with specific reference to computing device 110A1, interaction module 121 accesses information in data store 129. Interaction module 121 causes communication unit 115 to output a series of signals over network 105. Communication unit 155 of analysis computing system 150 detects a series of signals over network 105 and outputs information about the signals to data module 163. Data module 163 determines that the signals include information associated with assessments of target computing system 180A performed by computing device 110A1. Data module 163 stores information about the assessments in data store 169.

Other computing devices 110 communicate collected information to analysis computing system 150. For instance, referring again to FIG. 2, communication unit 155 detects other signals over network 105. Communication unit 155 outputs information about the signals to data module 163. Data module 163 determines that the signals include information relating to assessments performed by each of the other computing devices 110 pertaining to one or more of target computing systems 180. Data module 163 stores information about these additional assessments in data store 169.

Analysis computing system 150 may calculate a score that represents a vulnerability assessment for each of target computing systems 180. For instance, again with reference to the example being described in connection with FIG. 2, data module 163 communicates with analysis module 165. Analysis module 165 determines that the communication corresponds to an indication that data is ready and available to be used to assess vulnerability of one or more of target computing systems 180. Analysis module 165 accesses data in data store 169. Analysis module 165 evaluates the data and determines a score for each web page, service, application, and/or website available at each of target computing systems 180. In some examples, the score represents an assessed level of vulnerability to a denial-of-service attack, based on the information derived from interactions performed by computing devices 110.

Analysis module 165 may apply a number of factors when calculating a vulnerability score. For instance, analysis module 165 may calculate a score (which may be high for vulnerable services and low for less vulnerable services) by considering a combination of potential high latency services/applications, high element pages/connections, and/or extreme interval discrepancies, relative to a baseline interval or latency. Analysis module 165 may calculate the baseline based on latencies for other services or web pages. Analysis module 165 may assess observations, included within data store 169, about how many connections are opened per elements requested for a given service or web page. For example, one page could cause 3 connections to be opened, where another page could cause 5 connections to be opened due to the number of elements. Analysis module 165 may use such information in performing a comparison analysis when assessing vulnerability of a service or web page to an exhaustion-based attack. Analysis module 165 may use data derived from interval tests, where responses are be compared to known or observed baseline values for various technologies. If baseline values are used in such a comparison, information about infrastructure being used by a given service hosted at a given target computing system 180 may be determined. Interval values may be compared to identify extreme values that fall outside the default or baseline set. Analysis module 165 may rank each web page, service, application, and/or web site based on a differential calculated using the highest latency response for that service or web page, as compared with a baseline. Based on some or all of such factors, analysis module 165 generates one or more score reports 168. Analysis module 165 may store score reports 168 within data store 169.

Analysis computing system 150 may identify high risk services for further analysis. For example, again referring to FIG. 2, analysis module 165 of analysis computing system 150 accesses score reports 168 from data store 169. Analysis module 165 identifies high-scoring (e.g., most vulnerable) services, web pages, and/or websites from those offered by target computing systems 180 and evaluated by computing devices 110. Analysis module 165 evaluates the score reports and other conditions relating the vulnerability. Based on the evaluation, analysis module 165 determines recommends whether further actions should be taken for each high-scoring service. For example, analysis module 165 may determine that a denial-of-service exercise should be performed for one or more of the services. Alternatively, or in addition, analysis module 165 may determine that the findings reported within one or more score reports 168 should be validated through a lab mockup or other evaluation. Alternatively, or in addition, analysis module 165 may determine that one or more of the high-scoring services should be addressed through remediation, which may include modification or redesign of the service.

In some examples, interactions performed by one or more of computing devices 110 with target computing systems 180, as described herein, may be performed through raw web requests generated by a computing device 110 specifically designed or programmed to interact with target computing systems 180 for the purpose of collecting information (e.g., web page element counts, latencies) that can be used to assess a given target computing system 180 for vulnerabilities. Such a service may be implemented through, for example, a Python-developed program that sends raw requests from a given computing device 110 to a specific target computing system 180. One advantage of such an implementation is that measurement of various attributes of the interactions between computing devices 110 and target computing systems 180 is both feasible and readily implemented. Another advantage of such an implementation is that it enables sufficient request and interaction volume to effectively assess vulnerability to a denial-of-service attack. However, such an implementation might not provide complete information about the user experience that might be expected in the conditions under test. In particular, such an implementation might not assess certain aspects of some resources (e.g., JavaScript resources) that may execute in a browser. In some implementations, such scripts might not be executed in a program that operates by issuing raw requests to a given target computing system 180, and therefore, resources of that target computing system 180 that would otherwise interact with the executing script are not consumed or deployed by the target computing system 180 during a test.

Accordingly, in other examples, interactions performed by one or more computing devices 110 with target computing systems 180 may be performed by browser module 124. Browser module 124 may represent tools or logic that replicate interactions with target computing systems 180 in a way that more closely aligns with how a web browser operated by an actual user might interact with a given target computing system 180. For example, browser module 124 or a browser robot may be used to automate actions of an actual browser, thereby more closely emulating an actual user interacting with a given target computing system 180. Such a solution may more accurately assess the impact of scripts on the corresponding target computing system 180. Such a solution may also enable more accurate assessments of the user experience for the corresponding target computing system 180, since browser module 124 may maintain a browser context, and that browser context could be made available to accommodate JavaScript code and images received from a given target computing system 180. On the other hand, however, certain assessments of vulnerability to denial-of-service attacks may be more difficult using a browser robot implementation, at least partially because issuing highly-targeted and high-frequency requests to target computing systems 180 may be more difficult using a browser robot implementation. In some examples, aspects of browser module 124, as described herein, may be implemented through the Selenium WebDriver (available at www.selenium.dev), which is a collection of language-specific bindings to enable automation of a web browser (e.g., Mozilla's Firefox) for various purposes, including testing.

Modules illustrated in FIG. 2 (e.g., interaction module 121, collection module 123, browser module 124, configuration module 161, data module 163, analysis module 165) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 3:
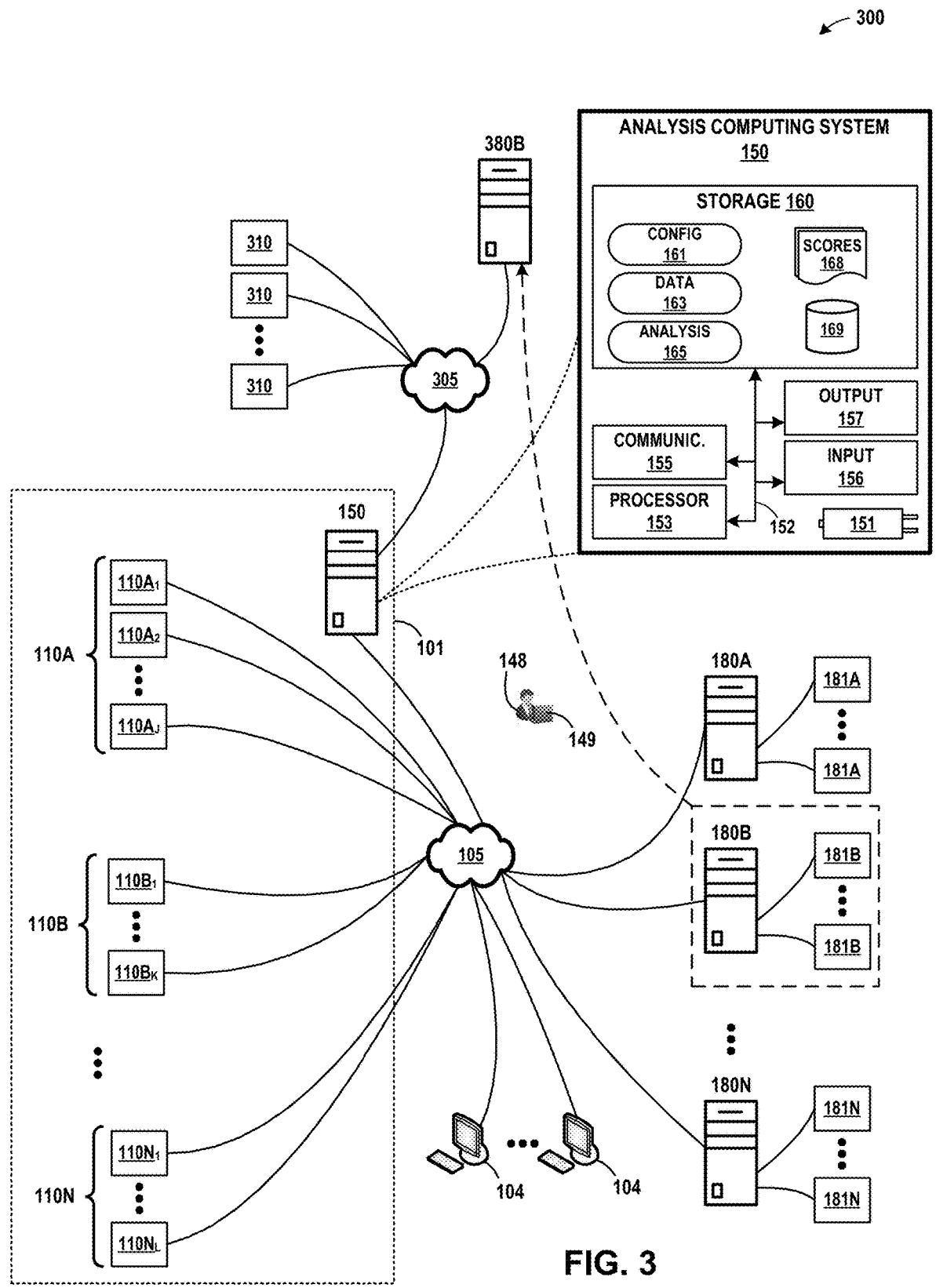
FIG. 3 is a conceptual diagram illustrating an example system in which a vulnerable target computing system is being further evaluated and/or modified in a lab setting, in accordance with one or more aspects of the present disclosure.

FIG. 3 is a conceptual diagram illustrating an example system in which a vulnerable target computing system is being further evaluated and/or modified in a lab setting, in accordance with one or more aspects of the present disclosure. FIG. 3 illustrates system 300, which may include elements of system 200. To the extent that system 300 of FIG. 3 includes elements described in connection with FIG. 1 and/or FIG. 2, such elements of FIG. 3 may correspond to the earlier-illustrated elements that are identified by like-numbered reference numerals.

FIG. 3 also includes validation computing system 380B and computing devices 310 in communication over lab network 305. In some examples, lab network 305 may be a private network, such as one that might be implemented in a private, testing, or lab setting. Validation computing system 380B may be a duplicate or mockup of target computing system 180B that is hosted in a lab setting. In some examples, validation computing system 380B might not be accessible to public user devices, and thus might not be accessible over network 105. Rather, validation computing system 380B may be deployed on lab network 305 for purposes of evaluation, study, and/or verification of data collected from interactions by computing devices 110 with target computing system 180B.

Each of computing devices 310 may be implemented in a manner similar to one or more of computing devices 110 of FIG. 1 and/or FIG. 2 (i.e., computing device 110A1). One or more of computing devices 310 may operate somewhat differently than computing devices 110, however, at least to the extent that computing devices 310 are implemented in a lab setting and/or on a private network. For instance, since validation computing system 380B might not be a production system, one or more of computing devices 310 might be configured to interact with validation computing system 380B in ways that enable a full evaluation of services and operations performed by validation computing system 380B, without concerns of affecting or preventing production operations of validation computing system 380B. In some cases, such interactions may degrade the operations of services provided by validation computing system 380B, partially or fully exploit vulnerabilities of validation computing system 380B, or cause one or more operations performed by validation computing system 380B to fail.

In accordance with one or more aspects of the present disclosure, analysis computing system 150 may identify target computing system 180B as hosting a service that should be further evaluated. For instance, in an example that can be described in the context of FIG. 3, analysis module 165 accesses score reports 168 from data store 169. Based on score reports 168, analysis module 165 identifies target computing system 180B, or a service executing on target computing system 180B, as being among the most vulnerable target computing systems 180 to a denial-of-service attack. Analysis module 165 further determines that target computing system 180B should be further evaluated.

Analysis computing system 150 may cause validation computing system 380 to be provisioned on lab network 305. For instance, with reference to the example being described in connection with FIG. 3, analysis module 165 causes communication unit 155 to output a signal over lab network 305. Provisioning systems (not shown) that are on lab network 305 determine that the signals correspond to a request to provision a new system (i.e., validation computing system 380B), as a mockup that is similar to (or in some cases, a duplicate) of target computing system 180B on network 105. Validation computing system 380B may include one or more supporting systems (not shown) that are similar to or correspond to supporting systems 181B for target computing system 180B. Analysis module 165 causes communication unit 155 to output a series of signals over lab network 305. Validation computing system 380B detects the set of signals and determines that the signals correspond to configuration settings. Validation computing system 380B applies the configuration settings, thereby configuring validation computing system 380B to operate in a manner that is the same, in relevant respects, to target computing system 180B.

Analysis computing system 150 may cause computing devices 310 to interact with validation computing system 380 over lab network 305. For instance, still with reference to FIG. 3, configuration module 161 of analysis computing system 150 causes communication unit 155 to output a series of signals over network 105. Each of computing devices 310 receive a signal and determine that the signal includes information about validation computing system 380 and how to interact with validation computing system 380. Responsive to the signals, each of computing devices 310 interact with validation computing system 380 over lab network 305. Each of computing devices 310 collect information about the interactions, in a manner similar to that described above in connection with computing devices 110 of FIG. 2.

Analysis computing system 150 may evaluate and act on information about the interactions between computing devices 310 and validation computing systems 380B. For instance, referring once more to the example being described in the context of FIG. 3, each of computing devices 310 output, over lab network 305, information about its interactions with validation computing system 380B. Communication unit 155 of analysis computing system 150 detects signals over lab network 305. Communication unit 155 outputs information about the signals to analysis module 165. Analysis module 165 determines that the signals correspond to information about interactions with validation computing system 380B over lab network 305.

Analysis module 165 uses the information to verify the vulnerabilities of validation computing system 380B to a denial-of-service attack (thereby also verifying vulnerabilities of target computing system 180B). Analysis module 165 may also learn additional information about the vulnerabilities of validation computing system 380B, to the extent that analysis computing system 150 may have access to or may have been given access to information about how validation computing system 380B has been implemented. In some examples, analysis module 165 may perform remediation of aspects of target computing system 180B. Such remediation may involve updated configuration or programming derived from input from administrator 148 (e.g., through administrator device 149) or other sources.

Figure 4:
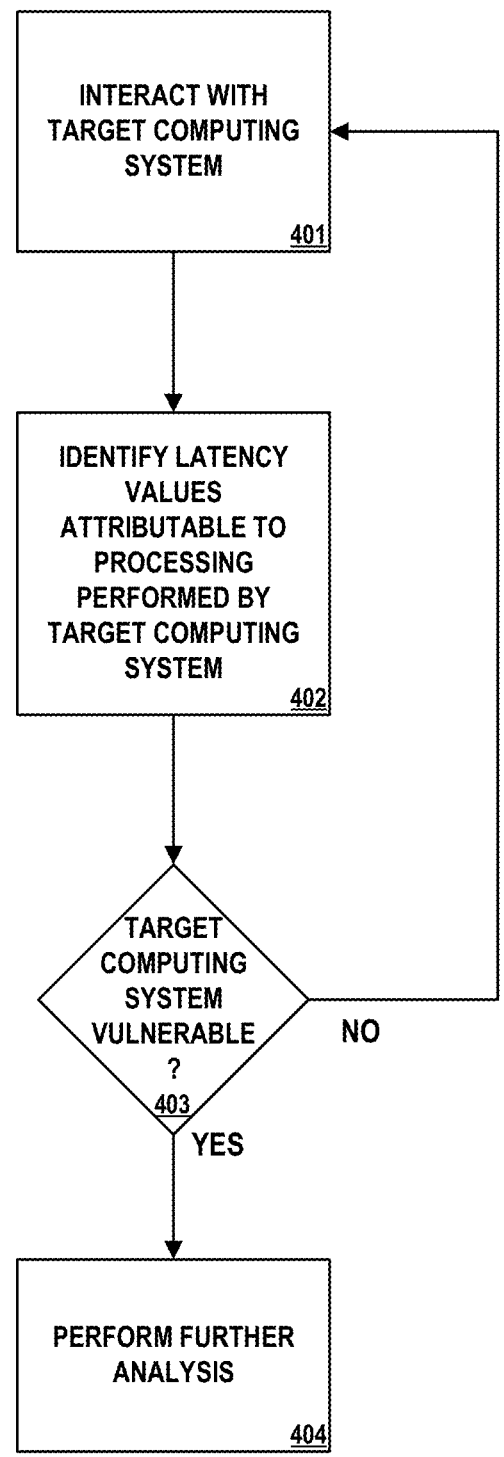
FIG. 4 is a flow diagram illustrating operations performed by an example assessment computing system in accordance with one or more aspects of the present disclosure.

FIG. 4 is a flow diagram illustrating operations performed by an example assessment computing system in accordance with one or more aspects of the present disclosure. FIG. 4 is described below within the context of assessment computing system 101 of FIG. 2. In other examples, operations described in FIG. 4 may be performed by one or more other components, modules, systems, or devices. Further, in other examples, operations described in connection with FIG. 4 may be merged, performed in a difference sequence, omitted, or may encompass additional operations not specifically illustrated or described.

In the process illustrated in FIG. 4, and in accordance with one or more aspects of the present disclosure, assessment computing system 101 may interact with a target computing system, wherein interacting includes issuing a plurality of requests to the target computing system and receiving a plurality of responses to the plurality of requests (401). For example, in the example of FIG. 1, one or more of computing devices 110 of assessment computing system 101 may output signals over network 105, destined for target computing system 180A. Target computing system 180A detect such signals and responds by outputting web pages and related information over network 105. Each of computing devices 110 may continue to issue requests to target computing system 180A and receive responsive web pages. Each of computing devices 110 output information about the interactions over network 105. Analysis computing system 150 receives the information about the interactions over network 105, and stores the information for later analysis.

Assessment computing system 101 may identify, based on the plurality of responses, a plurality of latency values that are attributable to processing performed by the target computing system (402). For example, again with reference to FIG. 1, analysis computing system 150 of assessment computing system 101 evaluates the information about the interactions with target computing system 180A that have been received from computing devices 110. In particular, analysis computing system 150 evaluates observed latencies associated with certain web pages served by target computing system 180A and interactions between computing devices 110 and target computing system 180A. Analysis computing system 150 determines to what extent such latencies are attributable to processing performed at target computing system 180A and/or at supporting systems 181A, rather than to network congestion or other causes.

Assessment computing system 101 may determine, based on the plurality of latency values, whether the target computing system is vulnerable to a denial-of-service attack (403). For example, analysis computing system 150 of assessment computing system 101 calculates a vulnerability score for target computing system 180A that provides an assessment of the extent to which target computing system 180A is vulnerable to a denial-of-service attack or a distributed denial-of-service attack. In calculating the score, analysis computing system 150 may consider the latency values as well as other factors, such as the number, type, and size of various elements within the web pages received from target computing system 180A.

Assessment computing system 101 may perform further analysis (404). For example, analysis computing system 150 of FIG. 1 may determine, based on the vulnerability score, that target computing system 180A should be further analyzed. Analysis computing system 150 may provision a mockup of target computing system 180A on a private network (e.g., in a lab setting). Analysis computing system 150 may interact or cause interaction with the mockup of target computing system 180A. Analysis computing system 150 may verify the assessed vulnerability of target computing system 180A, and may perform operations to remediate target computing system 180A.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The disclosures of all publications, patents, and patent applications referred to herein are each hereby incorporated by reference in their entireties. To the extent that any such disclosure material that is incorporated by reference conflicts with the instant disclosure, the instant disclosure shall control.

For ease of illustration, only a limited number of devices (e.g., computing devices 110, administrator device 149, analysis computing system 150, target computing systems 180, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated herein as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, or optical disk storage, magnetic disk storage, or other magnetic storage devices, flash memory, or any other medium that can be used to store desired program code in the form of instructions or data structures and that can be accessed by a computer. Also, any connection may properly be termed a computer-readable medium. For example, if instructions are transmitted from a website, server, or other remote source using a wired (e.g., coaxial cable, fiber optic cable, twisted pair) or wireless (e.g., infrared, radio, and microwave) connection, then the wired or wireless connection is included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
   interacting, by an assessment computing system, with a first target computing system, wherein interacting includes issuing a first plurality of requests to the first target computing system and receiving a first plurality of responses to the first plurality of requests;
   identifying, by the assessment computing system and based on the first plurality of responses, a first plurality of latency values that are attributable to processing performed by the first target computing system rather than network congestion;
   determining, by the assessment computing system and based on the first plurality of latency values, whether the first target computing system is vulnerable to a denial-of-service attack, wherein determining whether the first target computing system is vulnerable includes generating a first score representing an assessment of how vulnerable the first target computing systems is to a denial-of-service attack;
   interacting, by the assessment computing system, with a second target computing system, wherein interacting includes issuing a second plurality of requests to the second target computing system and receiving a second plurality of responses to the second plurality of requests;
   identifying, by the assessment computing system and based on the second plurality of responses, a second plurality of latency values that are attributable to processing performed by the second target computing system; and
   determining, by the assessment computing system and based on the second plurality of latency values, whether the second target computing system is vulnerable to a denial-of-service attack, wherein determining whether the second target computing system is vulnerable includes generating a second score representing an assessment of how vulnerable the second target computing systems is to a denial-of-service attack.

2. The method of claim 1, wherein the assessment computing system comprises an analysis computing system and a plurality of probe computing systems, and wherein issuing the first plurality of requests includes:
   issuing, by the plurality of probe computing systems and in a coordinated manner, the first plurality of requests.

3. The method of claim 2, wherein interacting with the first target computing system includes:
   interacting, by the probe computing systems, with the first target computing system; and
   reporting, by the probe computing systems and to the analysis computing system, information about the interactions.

4. The method of claim 1, wherein the first target computing system is a production computing system available on a public network, and wherein the method further comprises:
   configuring, by the assessment computing system, a validation computing system to simulate operations performed by the first target computing system;
   interacting, by the assessment computing system, with the validation computing system; and
   validating, by the assessment computing system and based on the interactions with the validation computing system, the determination of whether the first target computing system is vulnerable to a denial-of-service attack.

5. The method of claim 4, wherein validating the determination includes generating information about the validation computing system, and wherein the method further comprises:
   remediating, by the assessment computing system and based on the generated information, the first target computing system.

6. The method of claim 1, wherein determining whether the first target computing system is vulnerable includes:
   generating, based on the first plurality of latency values, a score representing an assessment of how vulnerable the target computing systems is to a denial-of-service attack.

7. The method of claim 6, wherein the first target computing system is a target website, and wherein generating the score includes generating the score additionally based on at least one of:
   a count of elements included within web pages available at the target website, a size associated with elements included within web pages available at the target website, an evaluation of how form input is handled by the target website, an evaluation of whether reflection is present within one or more web pages available at the target website, an assessment of whether database queries are generated by one or more web pages available at the target website, or an assessment of how the target website handles connections made by the assessment computing system.

8. The method of claim 1, further comprising:
   identifying, by the assessment computing system and based on the first score and the second score, the first target computing system for further analysis;
   configuring, by the assessment computing system, a validation computing system to simulate operations performed by the first target computing system;
   interacting, by the assessment computing system, with the validation computing system; and
   validating, by the assessment computing system, the determination of whether the first target computing system is vulnerable to a denial-of-service attack.

9. A computing system comprising processing circuitry and a storage device, wherein the processing circuitry has access to the storage device and is configured to:
   interact with a first target computing system, wherein interacting includes issuing a first plurality of requests to the first target computing system and receiving a first plurality of responses to the first plurality of requests;
   identify, based on the first plurality of responses, a first plurality of latency values that are attributable to processing performed by the first target computing system rather than network congestion;
   determine, based on the first plurality of latency values, whether the first target computing system is vulnerable to a denial-of-service attack, wherein to determine whether the first target computing system is vulnerable, the processing circuitry is further configured to generate, based on the first plurality of latency values, a first score representing an assessment of how vulnerable the first target computing systems is to a denial-of-service attack;

interact with a second target computing system, wherein interacting includes issuing a second plurality of requests to the second target computing system and receiving a second plurality of responses to the second plurality of requests;

identify, based on the second plurality of responses, a second plurality of latency values that are attributable to processing performed by the second target computing system; and determine, based on the second plurality of latency values, whether the second target computing system is vulnerable to a denial-of-service attack, wherein to determine whether the second target computing system is vulnerable, the processing circuitry is further configured to generate, based on the second plurality of latency values, a second score representing an assessment of how vulnerable the second target computing systems is to a denial-of-service attack.

10. The computing system of claim 9, wherein the computing system comprises an analysis computing system and a plurality of probe computing systems, and wherein to issue the first plurality of requests, the processing circuitry is further configured to:

enable the plurality of probe computing systems to issue, in a coordinated manner, the first plurality of requests.

11. The computing system of claim 10, wherein to interact with the first target computing system, the processing circuitry is further configured to:

enable the probe computing systems to interact with the first target computing system;

enable the probe computing systems to communicate the information about the interactions to the analysis computing system.

12. The computing system of claim 9, wherein the first target computing system is a production computing system available on a public network, and wherein the processing circuitry is further configured to:

configure a validation computing system to simulate operations performed by the first target computing system;

interact with the validation computing system; and validate, based on the interactions with the validation computing system, the determination of whether the first target computing system is vulnerable to a denial-of-service attack.

13. The computing system of claim 12, wherein to validate the determination, the processing circuitry generates information about the validation computing system, and wherein the processing circuitry is further configured to:

remediate, based on the generated information, the first target computing system.

14. The computing system of claim 9, wherein to determine whether the first target computing system is vulnerable, the processing circuitry is further configured to:

generate, based on the first plurality of latency values, a score representing an assessment of how vulnerable the first target computing system is to a denial-of-service attack.

15. The computing system of claim 14, wherein the first target computing system is a target website, and wherein to generate the score, the processing circuitry is further configured to generate the score further based on at least one of:

a count of elements included within web pages available at the target website, a size associated with elements included within web pages available at the target website, an evaluation of how form input is handled by the target website, an evaluation of whether reflection is present within one or more web pages available at the target website, an assessment of whether database queries are generated by one or more web pages available at the target website, or an assessment of how the target website handles connections made by the assessment computing system.

16. A non-transitory computer-readable medium comprising instructions that, when executed, configure processing circuitry of a computing system to:

interact with a first target computing system, wherein interacting includes issuing a first plurality of requests to the first target computing system and receiving a first plurality of responses to the first plurality of requests;

identify, based on the first plurality of responses, a first plurality of latency values that are attributable to processing performed by the first target computing system rather than network congestion; and determine, based on the plurality of first latency values, whether the first target computing system is vulnerable to a denial-of-service attack, wherein to determine whether the first target computing system is vulnerable, the processing circuitry is further configured to generate, based on the first plurality of latency values, a first score representing an assessment of how vulnerable the first target computing systems is to a denial-of-service attack;

interact with a second target computing system, wherein interacting includes issuing a second plurality of requests to the second target computing system and receiving a second plurality of responses to the second plurality of requests;

identify, based on the second plurality of responses, a second plurality of latency values that are attributable to processing performed by the second target computing system; and determine, based on the second plurality of latency values, whether the second target computing system is vulnerable to a denial-of-service attack, wherein to determine whether the second target computing system is vulnerable, the processing circuitry is further configured to generate, based on the second plurality of latency values, a second score representing an assessment of how vulnerable the second target computing systems is to a denial-of-service attack.

* * * * *

UNITED STATES PATENT AND TRADEMARK OFFICE
CERTIFICATE OF CORRECTION

| | | |
|---|---|---|
| PATENT NO. | : 12,212,594 B1 | Page 1 of 1 |
| APPLICATION NO. | : 17/455641 | |
| DATED | : January 28, 2025 | |
| INVENTOR(S) | : Shawn Wallis et al. | |

It is certified that error appears in the above-identified patent and that said Letters Patent is hereby corrected as shown below:

In the Claims

Column 27, Claim 11, Line 35: "…to communicate the information…" should be changed to --to communicate information--

Signed and Sealed this
Third Day of February, 2026

John A. Squires
*Director of the United States Patent and Trademark Office*